United States Patent
Hsu et al.

(10) Patent No.: US 12,177,713 B2
(45) Date of Patent: Dec. 24, 2024

(54) METHODS OF USING AGGREGATED CONTROL SUBFIELD FOR TRAFFIC INDICATION SIGNALING

(71) Applicant: MEDIATEK INC., Hsin-Chu (TW)

(72) Inventors: Chien-Fang Hsu, Hsinchu (TW); Kai Ying Lu, San Jose, CA (US); Yongho Seok, San Jose, CA (US); James Chih-Shi Yee, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 49 days.

(21) Appl. No.: 17/326,295

(22) Filed: May 20, 2021

(65) Prior Publication Data

US 2021/0377778 A1    Dec. 2, 2021

Related U.S. Application Data

(60) Provisional application No. 63/138,548, filed on Jan. 18, 2021, provisional application No. 63/029,744, filed on May 26, 2020.

(51) Int. Cl.
*H04W 28/02* (2009.01)

(52) U.S. Cl.
CPC ... *H04W 28/0236* (2013.01); *H04W 28/0268* (2013.01); *H04W 28/0278* (2013.01)

(58) Field of Classification Search
None
See application file for complete search history.

(56) References Cited

U.S. PATENT DOCUMENTS

| | | | |
|---|---|---|---|
| 2013/0235773 A1* | 9/2013 | Wang | H04W 52/0206 370/311 |
| 2013/0301500 A1* | 11/2013 | Koc | H04W 72/542 370/311 |
| 2015/0257144 A1* | 9/2015 | Hooli | H04W 72/21 370/329 |
| 2016/0057703 A1* | 2/2016 | Benoit | H04W 56/00 370/311 |
| 2018/0007712 A1* | 1/2018 | Lou | H04W 74/006 |
| 2019/0230678 A1* | 7/2019 | Chung | H04W 72/12 |
| 2019/0246312 A1* | 8/2019 | Kim | H04W 52/365 |
| 2020/0029350 A1* | 1/2020 | Asterjadhi | H04W 74/006 |
| 2020/0187228 A1* | 6/2020 | Cheng | H04W 72/0453 |
| 2020/0275430 A1* | 8/2020 | Salem | H04L 1/1614 |
| 2020/0314681 A1* | 10/2020 | Kuo | H04W 72/23 |

(Continued)

FOREIGN PATENT DOCUMENTS

| | | |
|---|---|---|
| CN | 107346996 A | 11/2017 |
| CN | 112840725 | * 5/2021 |
| KR | 101673097 | * 11/2016 |

OTHER PUBLICATIONS

Asterjadhi. HE A-Control field. IEEE 802.11-15/1121r0. Sep. 2015 (Year: 2015).*

*Primary Examiner* — Andre Tacdiran
(74) *Attorney, Agent, or Firm* — Winston Hsu

(57) ABSTRACT

A traffic indication signaling method includes: setting a control information subfield in an aggregated control (A-Control) subfield by traffic indication information, wherein the traffic indication information contains timing information of uplink (UL) traffic; and transmitting a frame that includes the A-Control subfield to an access point (AP). For example, the UL traffic is required by a latency sensitive traffic application.

20 Claims, 3 Drawing Sheets

(56) References Cited

U.S. PATENT DOCUMENTS

| | | | | |
|---|---|---|---|---|
| 2020/0323026 A1* | 10/2020 | Kim | ................ | H04W 72/23 |
| 2020/0351667 A1* | 11/2020 | Karaki | ................ | H04L 27/0006 |
| 2020/0404683 A1* | 12/2020 | Houghton | ............. | H04W 72/23 |
| 2020/0413285 A1* | 12/2020 | Li | ................ | H04W 28/0268 |
| 2021/0298054 A1* | 9/2021 | Wong | ................ | H04L 5/0053 |
| 2021/0360522 A1* | 11/2021 | Chitrakar | .......... | H04W 52/0216 |

* cited by examiner

| Type | Periodic Traffic ID | AC | Period (ms) | Delta Period (ms) | Traffic Size (octet) | Period Scaling Factor | Traffic Size Scaling Factor |
|---|---|---|---|---|---|---|---|
| 1 | 2 | 1 | 6 | 6 | 6 | 2 | 2 |

Bits:

FIG. 3

METHODS OF USING AGGREGATED CONTROL SUBFIELD FOR TRAFFIC INDICATION SIGNALING

CROSS REFERENCE TO RELATED APPLICATIONS

This application claims the benefit of U.S. provisional application No. 63/029,744 filed on May 26, 2020 and U.S. provisional application No. 63/138,548 filed on Jan. 18, 2021. The entire contents of the related applications, including U.S. provisional application No. 63/029,744 and U.S. provisional application No. 63/138,548, are incorporated herein by reference.

BACKGROUND

The present invention relates to wireless communications, and more particularly, to a method and apparatus of using an aggregated control (A-Control) subfield for traffic indication signaling between an access point (AP) and a non-AP station (STA).

In a wireless fidelity (WiFi) communication system, an access point (AP) may send a buffer status report polling (BSRP) frame to a non-AP station (STA), receive a buffer status report (BSR) from the non-AP STA, and then send a trigger frame to the non-AP STA to trigger uplink (UL) transmission. Specifically, the current BSRP/BSR provides a protocol for AP to acquire the buffer status of each access category (AC) on non-AP STA, so that AP can send the trigger frame to trigger UL traffic. However, using BSRP/BSR is unable to meet requirements of latency sensitive traffic applications, such as gaming control and industrial automation. Specifically, for latency sensitive and periodic UL traffic, waiting for AP's BSRP is not sufficient to satisfy jitter requirement and latency is not guaranteed. Since no timing/latency information is carried by BSR, AP may not trigger UL transmission of non-AP STA in time.

Moreover, In a WiFi communication system, the non-AP STA can send an add traffic stream (ADDTS) request with traffic specification (TSPEC) for signaling its quality of service (QoS) requirement to the AP, where TSPEC is used for doing negotiation with the AP, and may include data rate, packet size, etc. The AP decides whether the request is acceptable or not, and transmits its decision to the non-AP STA by an ADDTS response. The non-AP STA can start communication only when it is permitted to do so by the AP. In general, TSPEC negotiation can prevent the wireless link from being congested and can keep the communication quality good. For some latency sensitive traffic applications, UL burst traffic may happen and short term bandwidth is required. However, the current QoS traffic indication, such as TSPEC, cannot provide burst traffic information.

Thus, there is a need for an innovative traffic indication signaling design which is capable of meeting requirements of latency sensitive traffic applications under a WiFi environment.

SUMMARY

One of the objectives of the claimed invention is to provide a method and apparatus of using an aggregated control (A-Control) subfield for traffic indication signaling between an access point (AP) and a non-AP station (STA).

According to a first aspect of the present invention, an exemplary traffic indication signaling method is disclosed. The exemplary traffic indication signaling method includes: setting a control information subfield in an aggregated control (A-Control) subfield by traffic indication information, wherein the traffic indication information contains timing information of uplink (UL) traffic; and transmitting a frame that includes the A-Control subfield to an access point (AP).

According to a second aspect of the present invention, an exemplary traffic indication signaling method is disclosed. The exemplary traffic indication signaling method includes: receiving a frame that includes an aggregated control (A-Control) subfield from a non-access-point (non-AP) station; and decoding a control information subfield in the A-Control subfield to obtain traffic indication information, wherein the traffic indication information contains timing information of uplink (UL) traffic.

According to a third aspect of the present invention, an exemplary wireless communication device is disclosed. The exemplary wireless communication device is arranged to set a control information subfield in an aggregated control (A-Control) subfield by traffic indication information, and transmit a frame that includes the A-Control subfield to an access point (AP), wherein the traffic indication information contains timing information of uplink (UL) traffic.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram illustrating a control information subfield format for periodic UL non-burst traffic indication according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
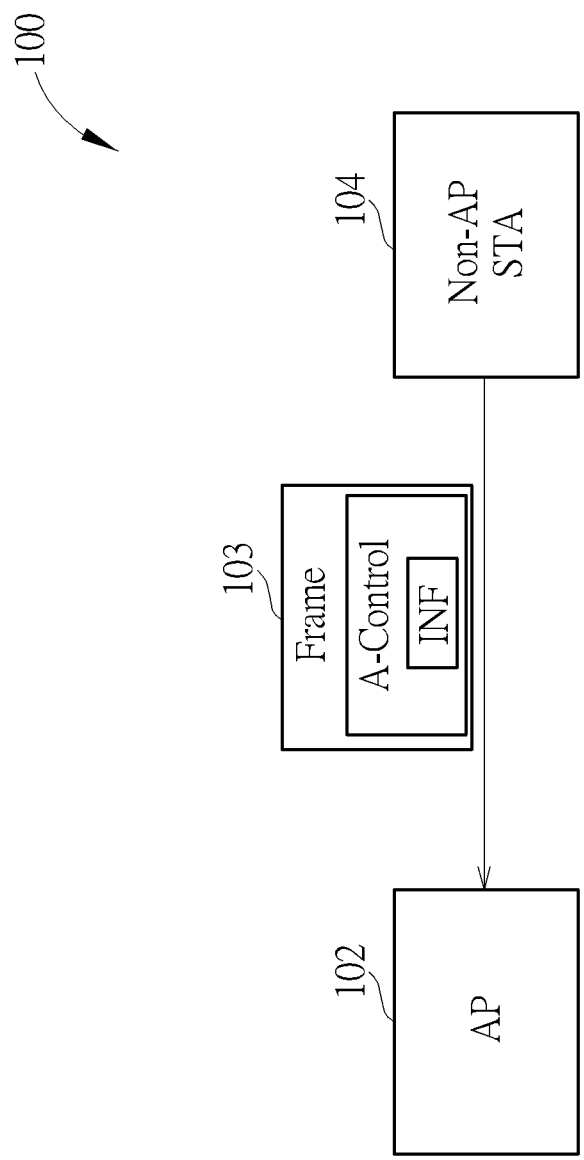
FIG. 1 is a diagram illustrating a WiFi communication system according to an embodiment of the present invention.

FIG. 1 is a diagram illustrating a wireless fidelity (WiFi) communication system according to an embodiment of the present invention. The WiFi communication system 100 has a plurality of wireless communication devices, including an access point (AP) 102 and a non-AP station (STA) 104. For example, both of AP 102 and non-AP STA 104 may be in compliance with IEEE 802.11 ax and IEEE 802.11 be standard. In this embodiment, the non-AP STA 104 sets a control information subfield in an aggregated control (A-Control) subfield by traffic indication information INF, and transmits a frame 103 that includes the A-Control subfield to the AP 102, wherein the traffic indication information INF contains timing information of uplink (UL) traffic. Hence, AP 102 receives the frame 103 (which includes the A-Control subfield) from non-AP STA 104, and decodes the control information subfield in the A-Control subfield to obtain the traffic indication information INF signaled from the non-AP STA 104. AP 102 can refer to the traffic indication information INF to allocate proper resources in advance, and can trigger UL transmission in time to thereby meet requirements of latency sensitive traffic applications.

Figure 2:
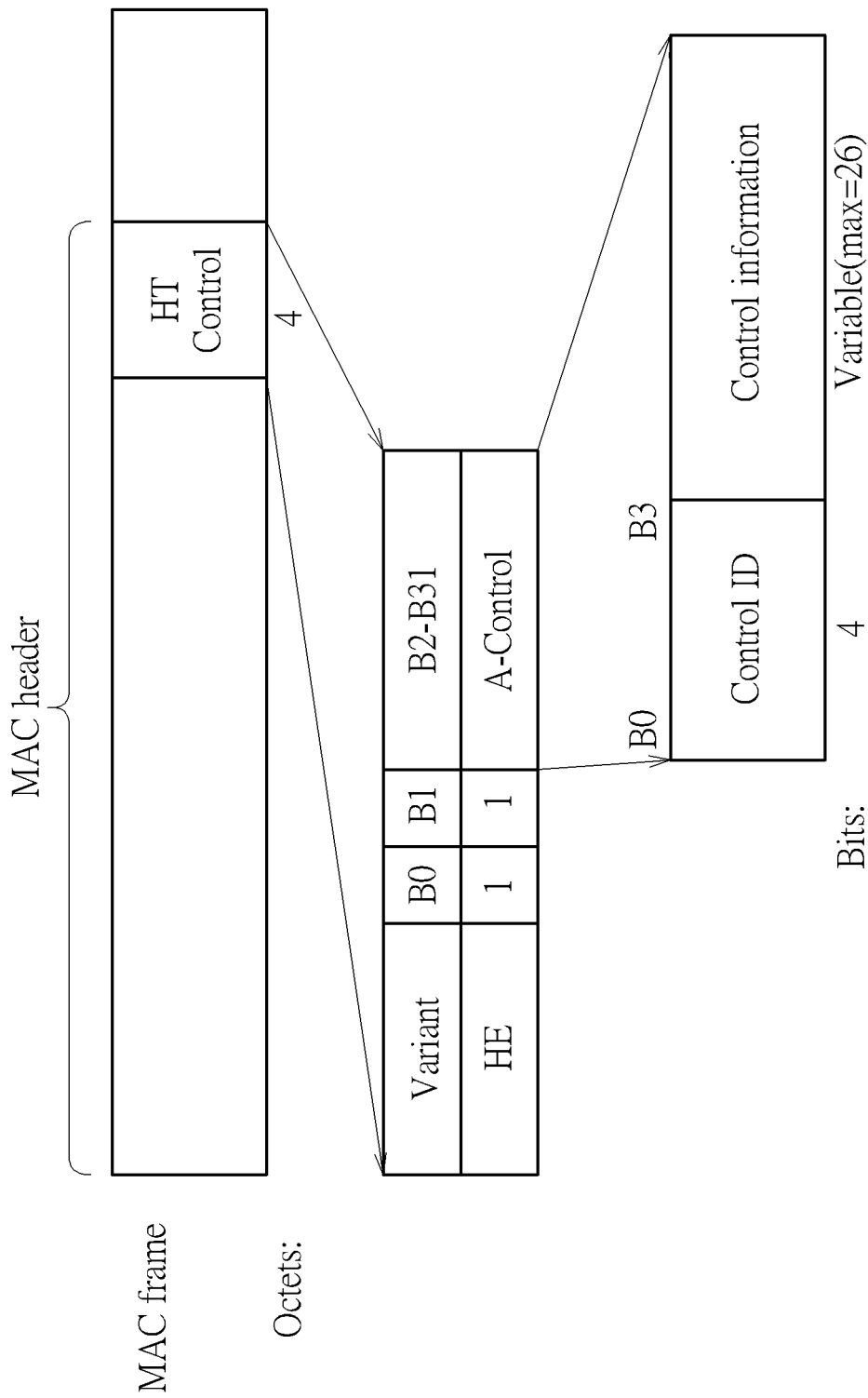
FIG. 2 is a diagram illustrating a format of an A-Control subfield included in an HE variant of an HT Control field according to an embodiment of the present invention.

FIG. 2 is a diagram illustrating a format of an A-Control subfield included in an HE (High Efficiency) variant of an HT (High Throughput) Control field according to an embodiment of the present invention. A media access control (MAC) header of a MAC frame includes an HT Control field, where the HT Control field is 4 octets in length. For example, the HT Control field is always present in a Control Wrapper frame, and is present in QoS Data, QoS Null and Management frames. The HT Control field has three variants: the HT variant, the VHT (Very High Throughput) variant, and the HE variant. The variant formats are differentiated by values of first two bits B0 and B1 of the HT Control field. As shown in FIG. 2, the first two bits B0 and B1 are 1's, meaning that the HT Control field contains the HE variant. The HE variant of the HT Control field has an A-Control subfield set by bits B2-B31 of the HT Control field. The A-Control subfield of the HE variant is 30 bits in length. In this embodiment, a control identifier (ID) subfield (4 bits) is set by a designated value to indicate that the proposed traffic indication information is carried by a control information subfield (maximum 26 bits). For example, the designated value may be one of values from 7 to 14. It should be noted that, the traffic indication information INF carried by the A-Control subfield is informative only, without being used for doing negotiation with the AP 102. In other words, the traffic indication information INF carried by the A-Control subfield is different from TSPEC included in an ADDTS request.

Consider a case where the UL traffic required by a latency sensitive traffic application is periodic UL non-burst traffic (i.e., long-term periodic UL traffic), the traffic indication information INF may include multiple parameters to describe characteristics of the periodic traffic. FIG. 3 is a diagram illustrating a control information subfield format for periodic UL non-burst traffic indication according to an embodiment of the present invention. A value of the control ID subfield of the A-Control subfield is set to indicate periodic UL non-burst traffic indication, and the traffic indication information INF carried by the control information subfield of the A-Control subfield may include a parameter "Period Traffic ID" indicating a traffic identifier of the periodic traffic, a parameter "Type" indicating whether to activate or deactivate the periodic traffic corresponding to the traffic ID, a parameter "AC" indicating an access category of the periodic traffic, a parameter "Period" indicating a period of the periodic traffic, a parameter "Delta Period" indicating a delta time from a frame (e.g., frame 103) carrying the A-Control subfield to a time instant the periodic traffic is transmitted by non-AP STA, a parameter "Traffic Size" indicating a traffic size of the periodic traffic, a parameter "Period Scaling Factor" indicating a period scaling factor, and a parameter "Traffic Size Scaling Factor" indicating a traffic size scaling factor. With the use of the period scaling factor, a longer period can be indicated by the proposed traffic indication signaling. Similarly, with the use of the traffic size scaling factor, a larger traffic size can be indicated by the proposed traffic indication signaling. With the help of traffic indication information INF carried by A-Control subfield, characteristics of the periodic UL non-burst traffic required by the latency sensitive traffic application are known to AP 102, and AP 102 can allocate proper resources in advance and can trigger UL transmission in time.

Consider another case where the UL traffic required by a latency sensitive traffic application is UL burst traffic, the traffic indication information INF may include multiple parameters for describing characteristics of the burst traffic that needs to transmit before specific timing. For example, the traffic indication information INF may include a parameter indicating a traffic ID of the burst traffic, a parameter indicating a delta time from a frame (e.g., frame 103) carrying the A-Control subfield to a time instant the burst traffic is transmitted by non-AP STA, a parameter indicating a traffic size of the burst traffic, an optional parameter indicating a traffic size scaling factor, an optional parameter indicating a period of periodic burst traffic, and an optional parameter indicating repetitions of periodic burst traffic. With the use of the traffic size scaling factor, a larger traffic size can be indicated by the proposed traffic indication signaling.

With the help of the period of periodic burst traffic and repetitions of periodic burst traffic, characteristics of burst traffic coming periodically for a short period of time can be indicated by the proposed traffic indication signaling.

The UL burst traffic may come only one time, or may come periodically for a short period of time. Assuming that the UL burst traffic is periodic UL burst traffic (i.e., short-term periodic UL traffic), a value of the control ID subfield of the A-Control subfield is set to indicate periodic UL burst traffic indication, and the traffic indication information INF carried by the control information subfield of the A-Control subfield may include a parameter indicating a traffic ID of the burst traffic, a parameter indicating a delta time from a frame (e.g., frame 103) carrying the A-Control subfield to a time instant the burst traffic is transmitted by non-AP STA, a parameter indicating a traffic size of the burst traffic, a parameter indicating a period of the burst traffic, a parameter indicating repetitions of the burst traffic, and an optional parameter indicating a traffic size scaling factor. With the help of traffic indication information INF carried by A-Control subfield, characteristics of the periodic UL burst traffic required by the latency sensitive traffic application are known to AP 102, and AP 102 can allocate proper resources in advance and can trigger UL transmission in time.

Assuming that the UL burst traffic is UL one-time burst traffic, a value of the control ID subfield of the A-Control subfield is set to indicate UL one-time burst traffic indication, and the traffic indication information INF carried by the control information subfield of the A-Control subfield may include a parameter indicating a traffic ID of the burst traffic, a parameter indicating a delta time from a frame (e.g., frame 103) carrying the A-Control subfield to a time instant the burst traffic is transmitted by non-AP STA, a parameter indicating a traffic size of the burst traffic, and an optional parameter indicating a traffic size scaling factor. With the help of traffic indication information INF carried by A-Control subfield, characteristics of the UL one-time burst traffic required by the latency sensitive traffic application are known to AP 102, and AP 102 can allocate proper resources in advance and can trigger UL transmission in time.

As mentioned above, non-AP STA 104 transmits the frame 103 to AP 102 for traffic indication signaling. In one exemplary traffic indication signaling design, the traffic indication information INF (which is carried by A-Control subfield) is transmitted to the AP 102 through unsolicited transmission. For example, non-AP STA 104 is not required to send the frame 103 (which includes A-Control subfield carrying traffic indication information INF) in response to a polling frame sent by AP 102. Hence, non-AP STA 104 can initiate the proposed traffic indication signal in a more dynamic and proactive way.

In another exemplary traffic indication signaling design, the traffic indication information INF (which is carried by A-Control subfield) is transmitted to the AP 102 in response to a polling frame sent by the AP 102. For example, non-AP STA 104 sends the frame 103 (which includes A-Control subfield carrying traffic indication information INF) in response to a BSRP frame sent by the AP 102. In some embodiments, when the polling frame is a BSRP frame, the traffic indication information INF may be reported in parallel with BSR. However, this is for illustrative purposes only, and is not meant to be a limitation of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A traffic indication signaling method comprising:
   setting a control information subfield in an aggregated control (A-Control) subfield by traffic indication information, wherein the traffic indication information contains timing information of uplink (UL) traffic; and
   transmitting a frame that includes the A-Control subfield to an access point (AP);
   wherein the traffic indication information is set and signaled by a non-AP station and comprises:
   a parameter indicating a delta time from a time instant of the frame carrying the A-Control subfield to a later time instant at which the UL traffic is to be transmitted;
   the traffic indication signaling method further comprises:
   according to the traffic indication information signaled by the non-AP station, allocating resources, by the AP, to trigger UL transmission in time to meet latency requirements of the UL traffic.

2. The traffic indication signaling method of claim 1, wherein the traffic indication information carried by the A-Control subfield is informative only.

3. The traffic indication signaling method of claim 1, wherein the UL traffic is required by a latency sensitive traffic application.

4. The traffic indication signaling method of claim 1, wherein the UL traffic is periodic UL traffic.

5. The traffic indication signaling method of claim 4, wherein the periodic UL traffic is UL non-burst traffic.

6. The traffic indication signaling method of claim 5, wherein the traffic indication information further comprises:
   a parameter indicating a traffic identifier (ID) of the UL traffic;
   a parameter indicating whether to activate or deactivate the UL traffic corresponding to the traffic ID;
   a parameter indicating an access category (AC) of the UL traffic;
   a parameter indicating a period of the UL traffic;
   a parameter indicating a traffic size of the UL traffic;
   a parameter indicating a period scaling factor; and
   a parameter indicating a traffic size scaling factor.

7. The traffic indication signaling method of claim 4, wherein the periodic UL traffic is UL burst traffic.

8. The traffic indication signaling method of claim 7, wherein the traffic indication information further comprises:
   a parameter indicating a traffic identifier (ID) of the UL traffic;
   a parameter indicating a traffic size of the UL traffic;
   a parameter indicating a period of the UL traffic; and
   a parameter indicating repetitions of the UL traffic.

9. The traffic indication signaling method of claim 8, wherein the traffic indication information further comprises:
   a parameter indicating a traffic size scaling factor.

10. The traffic indication signaling method of claim 1, wherein the UL traffic is UL one-time burst traffic.

11. The traffic indication signaling method of claim 10, wherein the traffic indication information further comprises:
    a parameter indicating a traffic identifier (ID) of the UL traffic; and
    a parameter indicating a traffic size of the UL traffic.

12. The traffic indication signaling method of claim 11, wherein the traffic indication information further comprises:
    a parameter indicating a traffic size scaling factor.

13. The traffic indication signaling method of claim 1, wherein the traffic indication information is transmitted to the AP through unsolicited transmission.

14. The traffic indication signaling method of claim 1, wherein the traffic indication information is transmitted to the AP in response to a polling frame sent by the AP.

15. The traffic indication signaling method of claim 14, wherein the polling frame is a buffer status report polling (BSRP) frame.

16. The traffic indication signaling method of claim 15, wherein the non-AP station reports the traffic indication information and a buffer status report (BSR) in response to receiving the BSRP frame.

17. A traffic indication signaling method comprising:
    receiving a frame that includes an aggregated control (A-Control) subfield from a non-access-point (non-AP) station; and
    decoding a control information subfield in the A-Control subfield to obtain traffic indication information, wherein the traffic indication information contains timing information of uplink (UL) traffic;
    wherein the traffic indication information is set and signaled by the non-AP station and comprises:
    a parameter indicating a delta time from a time instant of the frame carrying the A-Control subfield to a later time instant at which the UL traffic is to be transmitted;
    the traffic indication signaling method further comprises:
    according to the traffic indication information signaled by the non-AP station, allocating resources, by the AP, to trigger UL transmission in time to meet latency requirements of the UL traffic.

18. The traffic indication signaling method of claim 17, wherein the UL traffic is UL non-burst traffic, and the traffic indication information further comprises:
    a parameter indicating a traffic identifier (ID) of the UL traffic;
    a parameter indicating whether to activate or deactivate of the UL traffic corresponding to the traffic ID;
    a parameter indicating an access category (AC) the UL traffic;
    a parameter indicating a period of the UL traffic;
    a parameter indicating a traffic size of the UL traffic;
    a parameter indicating a period scaling factor; and
    a parameter indicating a traffic size scaling factor.

19. The traffic indication signaling method of claim 17, wherein the UL traffic is UL burst traffic, and the traffic indication information further comprises:
- a parameter indicating a traffic identifier (ID) of the UL traffic; and
- a parameter indicating a traffic size of the UL traffic.

20. A traffic indication signaling method comprising:
- setting a control information subfield in an aggregated control (A-Control) subfield by traffic indication information, wherein the traffic indication information contains timing information of uplink (UL) traffic; and
- transmitting a frame that includes the A-Control subfield to an access point (AP);
- wherein the UL traffic needs to be transmitted before a time instant, and the traffic indication information is set and signaled by a non-AP station and comprises a parameter that is set based at least partly on the time instant;
- the traffic indication signaling method further comprises:
- according to the traffic indication information signaled by the non-AP station, allocating resources, by the AP, to trigger UL transmission in time to meet latency requirements of the UL traffic.

* * * * *